(12) United States Patent
Futakuchi et al.

(10) Patent No.: US 7,944,799 B2
(45) Date of Patent: May 17, 2011

(54) OPTICAL INFORMATION APPARATUS WITH GAP CONTROL SYSTEM

(75) Inventors: Ryutaro Futakuchi, Osaka (JP); Masahiro Birukawa, Osaka (JP)

(73) Assignee: Panasonic Corporation, Osaka (JP)

( * ) Notice: Subject to any disclaimer, the term of this patent is extended or adjusted under 35 U.S.C. 154(b) by 249 days.

(21) Appl. No.: 12/374,384

(22) PCT Filed: Oct. 30, 2007

(86) PCT No.: PCT/JP2007/071125
§ 371 (c)(1),
(2), (4) Date: Jan. 20, 2009

(87) PCT Pub. No.: WO2008/053890
PCT Pub. Date: May 8, 2008

(65) Prior Publication Data
US 2009/0310467 A1    Dec. 17, 2009

(30) Foreign Application Priority Data
Nov. 1, 2006 (JP) ................................ 2006-297388

(51) Int. Cl.
*G11B 7/00* (2006.01)
(52) U.S. Cl. ............ 369/112.24; 369/112.23; 369/44.32; 369/53.19; 369/53.25
(58) Field of Classification Search ............... 369/44.32, 369/53.19, 53.25, 112.23, 112.24
See application file for complete search history.

(56) References Cited

U.S. PATENT DOCUMENTS 6,292,453 B1    9/2001 Ichimura et al.
6,791,913 B1    9/2004 Ishimoto
7,613,082 B2 *  11/2009 Ishimoto et al. ........... 369/44.32
2001/0021145 A1  9/2001 Ichimura et al.
2005/0190666 A1  9/2005 Ishimoto

FOREIGN PATENT DOCUMENTS

JP    H10-188301    7/1998
JP    2001-076358   3/2001

(Continued)

OTHER PUBLICATIONS

International Search Report for corresponding Application No. PCT/JP2007/071125 mailed Feb. 5, 2008.
Koichiro Kishima et al., "Multi Layer Disk Design for Near Field Phase-Change Recording", Mat. Res. Soc. Symp. Proc., vol. 803, pp. HH6.1.1-HH6.1.7, 2004.

*Primary Examiner* — Wayne R Young
*Assistant Examiner* — Latanya Bibbins
(74) *Attorney, Agent, or Firm* — Renner, Otto, Boisselle & Sklar, LLP

(57) ABSTRACT

An optical information apparatus according to the present invention includes: an optical system that includes a solid immersion lens (SIL) 11 and that produces near-field light to be incident on an optical disc 10; a first actuator for displacing the SIL 11; a second actuator 29 for varying the distance between the optical disc 10 and the first actuator 12 by moving the first actuator 12; a gap detecting section 18 for outputting a gap signal 19 representing the magnitude of the gap 17 between the SIL 11 and the optical disc 10; and a gap control system for controlling the first actuator 12 in response to the gap signal 19 such that the gap is maintained at a predetermined setting. The gap control system works so as to control the second actuator 29 in accordance with a signal representing the magnitude of displacement of the SIL 11 caused by the first actuator 12.

7 Claims, 6 Drawing Sheets

FOREIGN PATENT DOCUMENTS

| | | |
|---|---|---|
| JP | 2002-319160 | 10/2002 |
| JP | 2002-391160 | 10/2002 |
| JP | 2004-335064 | 11/2004 |
| JP | 2005-209246 | 8/2005 |

* cited by examiner (a)

(b)

OPTICAL INFORMATION APPARATUS WITH GAP CONTROL SYSTEM

TECHNICAL FIELD

The present invention relates to an optical information apparatus for reading and/or writing data from/on an optical information storage medium using near-field light.

BACKGROUND ART

A technique for further increasing the data storage density of an optical disc by using a solid immersion lens (SIL) and near-field light has been proposed. A typical SIL is a high-refractive-index lens, of which the shape is defined by cutting out a portion of a spherical lens. An SIL is inserted between a condenser lens and an optical disc to produce near-field light at the bottom.

To read and write data from/on an optical disc using an SIL, the SIL and the surface of the optical disc need to be so close to each other that the near-field light can reach the surface of the optical disc. In addition, by performing a so-called "gap control" to keep the gap between the SIL and the optical disc surface constant, the light beam spot on either the disc surface or the information storage layer should maintain a predetermined size.

Such a gap control is carried out by taking advantage of the property that the intensity of the light returning from an SIL varies its level according to the magnitude of the gap between the SIL and the given optical disc. Patent Document No. 1 discloses an exemplary optical information apparatus that performs such a gap control. Specifically, such a gap control is carried out by comparing a voltage converted from the intensity level of the light returning from the SIL to a reference voltage representing a desired gap and by getting the SIL driven by an actuator such that the difference between these two values becomes as small as possible. The magnitude of the gap can be varied by changing the reference voltages.

Patent Document No. 1: Japanese Patent Application Laid-Open Publication No. 2002-319160

DISCLOSURE OF INVENTION

Problems to be Solved by the Invention

The near-field light produced at the edge of the SIL (i.e., a portion of the lens facing the optical disc) can reach so small a distance as about 20 nm, for example, that when an optical information apparatus is loaded with an optical disc, it is not until the SIL is brought sufficiently close to the optical disc that the gap control for maintaining the gap constant should be started (i.e., the control loop should be closed). Specifically, to bring the SIL, which is initially located far away from the optical disc, sufficiently close to the surface of the optical disc, the operation of moving the SIL to the vicinity of the surface of the optical disc with an actuator that changes the positions of the SIL supplied with current (which will be referred to herein as a "surface search operation") needs to be carried out.

The gap between the optical disc and the SIL while the optical disc is being loaded into the optical information apparatus and when the disc has just been loaded into the apparatus should be at least about 300 µm, considering the mechanical design precision of the optical information apparatus. That is why the distance to go for the SIL by performing the surface search operation described above is approximately equal to 300 µm. In that case, the actuator to which the SIL is attached will perform a gap control in an offset state in which the SIL has been offset by approximately 300 µm from its initial position. In other words, when the gap control loop is closed, the actuator needs to maintain an offset of approximately 300 µm with respect to the actuator compared to its mechanical equilibrium state.

Once the gap control has been established, alternating current, of which the frequency components correspond to the out-of-plane vibrations of the optical disc, is supplied to the actuator in order to keep the gap between the optical disc and the SIL constant (e.g., at 20 nm in this example) by catching up with the out-of-plane vibrations of the disc. In addition, DC current for maintaining the offset of approximately 300 µm also needs to flow through the actuator. This DC current has nothing to do with the original purpose of the gap control and just increases the power dissipation. The amount of such extra current varies according to the current to displacement sensitivity of the actuator but is generally in the range of approximately 300 to 500 mA, which is never a negligible amount, considering the overall power dissipation of the optical information apparatus, and is apparently unbeneficial for the apparatus. Furthermore, even in a situation where such an increase in power dissipation is negligible, if the gap control were performed while the actuator is out of the mechanical equilibrium state, the control should be unable to maintain good stability, which is also a problem.

Next, it will be described what problem will arise if the gap control is tried on an optical disc with a different reflectance.

As described above, in performing a gap control, first, the voltage converted from the intensity of the light returning from the SIL is compared to a reference voltage representing the magnitude of a desired gap, and their difference is amplified. Then, the position of the SIL is controlled with the actuator so as to reduce that amplified difference, thereby keeping the gap between the SIL and the optical disc constant. However, if the reflectance of a given optical disc were different from the expected one, then the intensity of the returning light would be detected with a different level of sensitivity and the voltage value converted from the intensity of the returning light would also be different. As a result, if the reference voltage were defined to be constant, the magnitude of the gap to be determined by that constant setting would vary according to the reflectance of the optical disc. In other words, the gap would vary due to a difference in reflectance between the optical discs and could not maintain the desired magnitude. If the gap deviated from the desired setting in this manner, the read/write performance using the near-field light would be seriously affected.

In order to overcome the problems described above, the present invention has an object of providing, first and foremost, an optical information apparatus that can control the gap without significantly offsetting the SIL with respect to the actuator that controls the position of the SIL.

Another object of the present invention is to provide an optical information apparatus that can always maintain an appropriate gap between any given optical disc and the SIL even if the optical disc has a different reflectance from the expected one.

Means for Solving the Problems

An optical information apparatus according to the present invention includes: an optical system that includes a solid immersion lens and that produces near-field light to be incident on an optical information storage medium; a first actuator for displacing the solid immersion lens; a second actuator for varying the distance between the optical information storage medium and the first actuator by moving the first actuator; a gap detecting section for outputting a gap signal representing the magnitude of the gap between the solid immersion lens and the optical information storage medium; and a gap control system for controlling the first actuator in response to the gap signal such that the gap is maintained at a predetermined setting. The gap control system works so as to control the second actuator in accordance with a signal representing the magnitude of displacement of the solid immersion lens caused by the first actuator.

In one preferred embodiment, the signal representing the magnitude of displacement of the solid immersion lens caused by the first actuator is a DC component of a drive signal to be supplied to the first actuator. The second actuator is controlled so as to minimize the DC component of the drive signal.

In this particular preferred embodiment, the drive signal is current supplied to the first actuator, and the magnitude of displacement of the solid immersion lens caused by the first actuator is proportional to the amount of the current supplied to the first actuator.

In another preferred embodiment, the optical information apparatus includes an optical pickup that is movable parallel to the surface of the optical information storage medium. The solid immersion lens and the first actuator are arranged inside the optical pickup. And the second actuator moves the optical pickup perpendicularly to the surface of the optical information storage medium.

An optical information apparatus controlling method according to the present invention is a method for driving the optical information apparatus. The method includes the steps of: getting the solid immersion lens displaced by the first actuator, thereby bringing the solid immersion lens closer to the optical disc; activating the gap control system to control the first actuator such that the gap is maintained at the predetermined setting in response to the gap signal supplied from the gap detecting section; and making the gap control system work so as to control the second actuator in accordance with the signal representing the magnitude of displacement of the solid immersion lens by the first actuator and bring the first actuator closer to the optical disc with the gap maintained at the predetermined setting.

Another optical information apparatus according to the present invention includes: an optical system that includes a solid immersion lens and that produces near-field light to be incident on an optical disc; an actuator for displacing the solid immersion lens; a gap detecting section for outputting a gap signal representing the magnitude of the gap between the solid immersion lens and the optical disc; and a gap control system for controlling the actuator in response to the gap signal such that the gap is maintained at a predetermined setting. The apparatus calculates a control target value for the gap signal, corresponding to the predetermined gap setting, in accordance with a gap detection characteristic defining a relation between the gap and the gap signal. And the gap control system controls the actuator such that the gap signal comes to have the control target value.

In one preferred embodiment, the gap detection characteristic is determined based on first and second values of the gap-signal to be output from the gap detecting section when first and second gaps respectively are left between the solid immersion lens and the optical disc.

In this particular preferred embodiment, the control target value V for the gap signal, corresponding to the predetermined gap setting G, is calculated by $$V = B + K(A - B)\frac{G}{X}$$

where A is the first value when the first gap is defined to be sufficiently greater than the spot size of the near-field light, B is the second value when the second gap is defined to be smaller than the size of the near-field light, G is the magnitude of the gap between the solid immersion lens and the optical disc, K is a correction coefficient, and X is the wavelength of the near-field light.

Another optical information apparatus controlling method according to the present invention is a method for driving the optical information apparatus described above. The method includes the steps of: getting, as a first value, the level of the gap signal supplied from the gap detecting section with the solid immersion lens kept off the optical disc so that the near-field light is unable to reach the optical disc; getting, as a second value, the level of the gap signal supplied from the gap detecting section with the solid immersion lens brought closer to the optical disc; determining a gap detection characteristic defining a relation between the gap and the gap signal by the first and second values; and calculating the control target value for the gap signal, corresponding to the predetermined gap setting, based on the gap detection characteristic. The actuator is controlled such that the gap signal comes to have the control target value.

EFFECTS OF THE INVENTION

In an optical information apparatus according to the present invention, after the gap control has been established, the SIL can maintain a stabilized positional relation with respect to the first actuator. As a result, the control of the first actuator can be stabilized or the amount of wasteful offset current flowing through the first actuator can be reduced.

Also, another optical information apparatus according to the present invention performs a gap control in accordance with the detection characteristic of the gap between the SIL and the optical disc, which changes with the reflectance of the optical disc. As a result, a gap of a desired magnitude can be left without being affected by the difference in reflectance between optical discs.

DESCRIPTION OF REFERENCE NUMERALS

Figure 1:
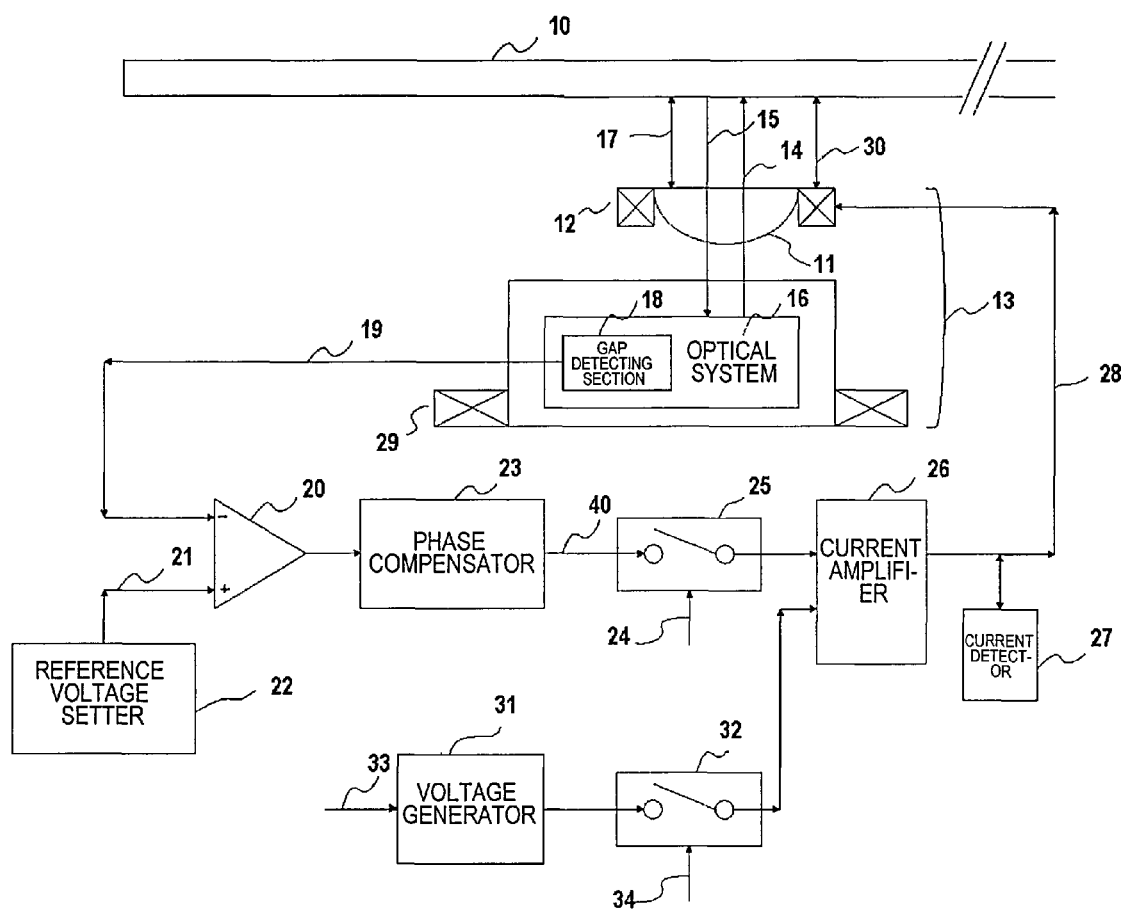
FIG. 1 illustrates a first preferred embodiment of an optical information apparatus according to the present invention.

10 optical disc
11 SIL (solid immersion lens)

12 first actuator
13 optical pickup
14 irradiating light
15 reflected light
16 optical system
17 gap
18 gap detecting section
19 gap signal
20 differential amplifier
21 reference voltage
22 reference voltage setter
23 phase compensator
24 loop open/close instruction
25 loop switch
26 current amplifier
27 current detector
28 output current
29 second actuator
30 distance between first actuator and optical disc
31 voltage generator
32 switch
33 set instruction
34 open/close instruction
40 gap control signal
100 condenser lens

BEST MODE FOR CARRYING OUT THE INVENTION

Embodiment 1

Hereinafter, a configuration for an optical information apparatus as a first preferred embodiment of the present invention will be described with reference to FIG. 1.

An optical information apparatus according to this preferred embodiment is implemented as an optical disc drive including an optical system that produces near-field light using an SIL 11. The optical disc drive can read and write data from/on an optical disc 10, which is an exemplary optical information storage medium, at high densities. Specifically, this optical information apparatus includes an optical pickup 13 for optically accessing the optical disc 10. The optical pickup 13 includes an optical system 16 for emitting irradiating light 14 toward a target address location on the optical disc 10 through the SIL 11 and detecting and processing the light 15 reflected from the optical disc 10. The optical pickup 13 can be displaced parallel to the surface of the optical disc 10 (i.e., in the radial direction) by a traverse mechanism (not shown) and can access any desired location in the radial direction on the optical disc 10.

The optical information apparatus of this preferred embodiment further includes a motor (not shown) for rotating the optical disc 10, which is an exemplary disklike optical information storage medium. This optical disc drive may be a player that can only read data or a recorder/player that can both read and write data. However, an optical information apparatus according to the present invention does not have to be such an optical disc drive but may also be a device for reading and/or writing data from/on a non-rotating card type optical information storage medium.

The optical pickup 13 includes a first actuator 12 for displacing the SIL 11. Thanks to the action of the first actuator 12, the SIL 11 can move at least perpendicularly to the housing or the base portion of the optical pickup 13 by about 500 µm, for example.

In this preferred embodiment, the first actuator 12 has a mechanism that holds a lens holder (not shown) with an elastic member such as a spring and that moves the lens holder to a degree corresponding to the magnitude of the drive current. Only the SIL 11 is fitted into the lens holder. However, any other lens (such as a condenser lens) may also be fitted along with the SIL 11. In this preferred embodiment, the drive current that has been supplied to the first actuator 12 flows through a coil in the actuator 12, thereby generating a magnetic field. And on receiving magnetic force from this magnetic field, the lens holder moves. When the magnitude of the drive current is equal to zero, the lens holder remains at its rest position (i.e., in mechanically equilibrium state) without resisting the elastic force applied by the spring. As the magnitude of the drive current increases, however, the lens holder can move increasingly by overcoming the elastic force.

Naturally, the configuration of the first actuator 12 is never limited to the illustrated one. Any other actuator may also be used in the present invention as long as the actuator can displace the SIL 11 according to the amount of current supplied. Optionally, the first actuator 12 may have an additional mechanism for displacing the SIL 11 parallel to the surface of the optical disc 10 or tilting the SIL 11.

The optical pickup 13 of this preferred embodiment further includes a gap detecting section 18 for detecting the gap 17 between the SIL 11 and the optical disc 10. The gap detecting section 18 outputs a gap signal 19 representing the magnitude of the gap 17 between the SIL 11 and the optical disc 10.

Figure 6:
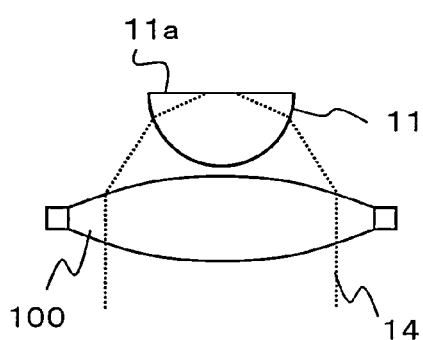
FIGS. 6(a) and 6(b) are cross-sectional views schematically illustrating a situation where irradiating light 14 is totally reflected and a situation where the SIL 11 has come very close to the optical disc 10, respectively.
Figure 6:
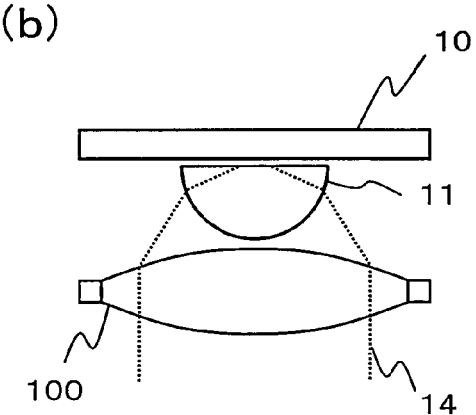

When the SIL 11 is sufficiently distant from the optical disc 10, the irradiating light 14 is totally reflected from the edge of the SIL 11 that is opposed to the optical disc. In this case, the intensity of the light returning from the SIL 11 is constant irrespective of the magnitude of the gap between the SIL 11 and the optical disc 10. FIG. 6(a) schematically illustrates how the irradiating light 14 is totally reflected. In FIG. 6(a), also illustrated is a condenser lens 100 to be driven along with the SIL 11. In this example, the irradiating light 14 is converged by the condenser lens 100 and then incident on the curved surface of the SIL 11. The irradiating light 14 that has been incident on the SIL 11 is totally reflected from the edge 11a of the SIL 11. In this manner, even while the light is totally reflected from the edge 11a of the SIL 11, near-field light still leaks through that edge 11a.

FIG. 6(b) illustrates a situation where the optical disc 10 is located rather close to the SIL 11. If the SIL 11 is located so close to the optical disc 10 that the near-field light, leaking through the edge of the SIL 11, reaches the surface of the optical disc 10, then part of the irradiating light 14 will not return. As a result, the intensity of the light returning from the SIL 11 will decrease. In this case, the intensity of the light returning from the SIL 11 depends on the magnitude of the gap between the optical disc 10 and the SIL 11. That is why by detecting the intensity of the returning light, the magnitude of the gap can also be sensed.

The gap detecting section 18 of this preferred embodiment is supposed to sense the magnitude of the gap 17 shown in FIG. 1 by the method described above. However, the gap detecting section 18 is not limited to such an example. Alternatively, a configuration for detecting the magnitude of the gap 17 based on the value of the electrostatic capacitance between the SIL 11 and the optical disc 10 may also be used.

In this preferred embodiment, the gap signal 19 has a component that varies substantially proportional to the magnitude of the gap 17 if the SIL 11 is located rather close to the surface of the optical disc 10 and if the near-field light produced by the SIL 11 reaches the surface of the optical disc 10. On the other hand, if the SIL 11 is sufficiently distant from the surface of the optical disc 10, then the magnitude of the gap cannot be detected based on the gap signal 19. In this preferred embodiment, the gap signal 19 is an analog voltage signal. However, the gap signal 19 may also be a current signal or may have been converted into a digital signal, too.

The optical information apparatus of this preferred embodiment further includes a second actuator 29 for moving the first actuator 12 as well as the optical pickup 13. By driving the second actuator 29, the optical pickup 13 itself can be moved up and down, thus varying the distance between the optical disc 10 and the first actuator 12. In order to cut down the power dissipation, the second actuator 29 preferably has a different configuration from the first actuator 12 for the reasons to be described later. Specifically, it is preferred that the second actuator 29 have such a configuration as to avoid an increase in power dissipation even if the magnitude of displacement is great. For example, the second actuator 29 may be either a screw that can have the magnitude of its displacement adjusted by the user's manipulation or some mechanism that can have the magnitude of its displacement adjusted with a stepping motor.

In this preferred embodiment, a gap control system is implemented so as to control the first actuator 12 such that the magnitude of the gap 17 is maintained at a predetermined value in accordance with the gap signal 19. While the gap control system is working, even if the point of incidence of the irradiating light 14 on the surface of the optical disc 10 (i.e., the access location) moves up and down due to the out-of-plane vibrations of the optical disc 10 rotating, the first actuator 12 can still make the SIL 11 catch up with the vertical movement of the point of incidence. As a result, the gap can be kept equal to the predetermined value.

The essential feature of this preferred embodiment lies in controlling the second actuator 29 in accordance with a signal representing the magnitude of displacement of the SIL 11 caused by the first actuator 12 while the gap control system is working. By performing such a control, the first actuator 12 can be moved from its rest position toward the optical disc 10. As a result, the first actuator 12 can operate almost in its mechanically equilibrium state. This operation will be described in detail later.

The gap signal 19 that has been output from the gap detecting section 18 in the optical pickup 13 may be supplied to the inverting input terminal of a differential amplifier 20 in the optical information apparatus. On the other hand, a reference voltage 21 that has been set independently by a reference voltage setter 22 is input to the non-inverting input terminal of the differential amplifier 20. By making differential amplification, the differential amplifier 20 amplifies the potential difference between the gap signal 19 and the reference voltage 21 and outputs the amplified difference.

The output of the differential amplifier 20 is converted by a phase compensator 23 into a gap control signal 40, which is then input to a power amplifier 26 by way of a loop switch 25. The opening and closing states of the loop switch 25 are controlled in accordance with a loop open/close instruction 24. The output current 28 of the power amplifier 26 is supplied to the first actuator 12, which moves the SIL 11 up and down according to the amount of the output current 28 supplied. The amount of the output current 28 of the power amplifier 26 may be detected by a current detector 27. And the magnitude of displacement of the SIL 11 can be calculated based on the amount of the output current 28 detected.

If the loop switch 25 is closed in accordance with the loop open/close instruction 24, the gap 17 is controlled to a magnitude corresponding to the reference voltage 21 that has been set by the reference voltage setter 2, thus getting the gap control done.

The second actuator 29 can move the optical pickup 13 up and down in its entirety and therefore can vary the distance 30 between the first actuator 12 and the optical disc 10. In this preferred embodiment, the second actuator 29 may be operated manually.

A voltage generator 31 has its output state determined in accordance with a set instruction 33 and has its output supplied to the current amplifier 26. The opening and closing states of a switch 32 are controlled in accordance with an open/close instruction 34. Not only the gap control signal 40 described above but also the output signal of the voltage generator 31 may be input to the current amplifier 26. However, by controlling the opening and closing states of the loop switch 25 and the switch 34, either the gap control signal 40 or the output signal of the voltage generator 31 is selectively supplied as an input signal to the current amplifier 26. Optionally, if the voltage generator 31 has an integrating function, its output voltage may be varied linearly with time.

Figure 2:
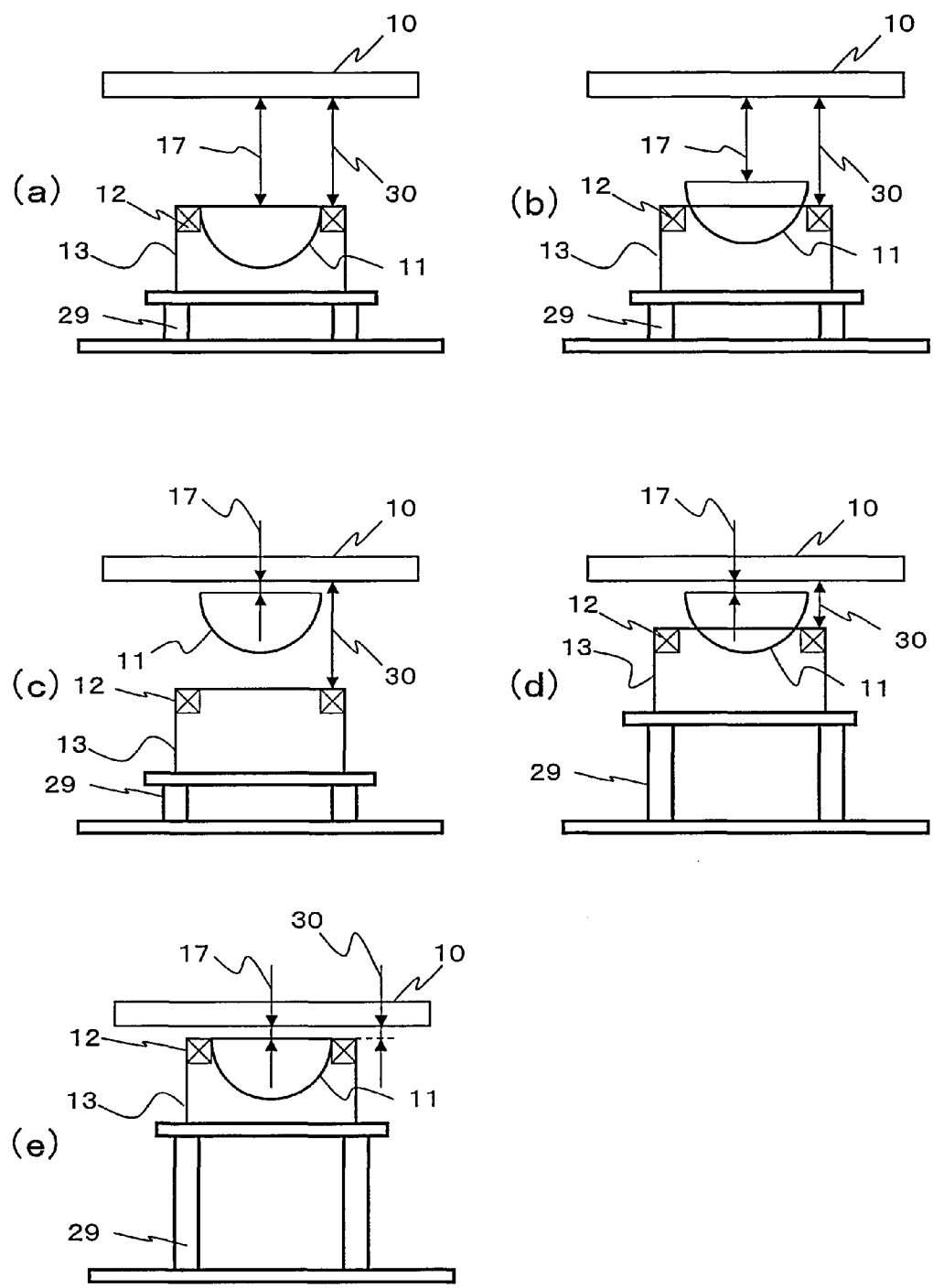
FIGS. 2(a) through 2(e) are schematic cross-sectional views illustrating how the first and second actuators 12 and 29 operate in the preferred embodiment shown in FIG. 1.

Hereinafter, it will be described with reference to FIGS. 1 and 2 how the optical information apparatus of this preferred embodiment operates. FIGS. 2(*a*) through 2(*e*) are schematic cross-sectional views illustrating how the first and second actuators 12 and 29 operate. Only the core portion of the optical information apparatus is shown diagrammatically in FIGS. 2(*a*) through 2(*e*) for the sake of simplicity. As for the optical pickup 13, for example, the illustration of the optical system 16, the gap detecting section 18 and condenser lens 100 (see FIG. 6) is omitted to show the position of the optical pickup 13 with respect to the optical disc 10 more clearly.

First, when the optical information apparatus is loaded with the optical disc 10, the reference voltage setter 22 shown in FIG. 1 supplies a reference voltage 21, which has been set to a value corresponding to a predetermined gap, to the non-inverting input terminal of the differential amplifier 20. At this point in time, the loop switch 25 is still opened following the loop open/close instruction 24, while the switch 32 is closed following the open/close instruction 34. That is why the current amplifier 26 now accepts the output signal of the voltage generator 31 as its input signal.

FIG. 2(*a*) shows the relative positions of the SIL 11, the optical disc 10 and other members at this point in time. As shown in FIG. 2(*a*), the magnitude of the gap 17 between the SIL 11 and the optical disc 10 is sufficiently wide, and therefore, the distance 30 between the first actuator 12 and the optical disc 10 is also sufficiently long, which may be in the range of approximately 200-400 μm, typically 300 μm. The gap 17 between the SIL 11 and the optical disc 10 is initially defined to be that wide in order to prevent the optical disc 10 from colliding against the SIL 11 while the optical disc 10 is being loaded into the optical information apparatus. At this point in time, the SIL 11 has not been displaced by the first actuator 12 yet. For that reason, no drive current for displacement is being supplied to the first actuator 12 and the SIL 11 is now located at the mechanically equilibrium position of the first actuator 12.

Next, a set instruction 33 is given to the voltage generator 31 so that the voltage generator 31 shown in FIG. 1 outputs an appropriate voltage. Due to the integrating function of the voltage generator 31, the current amplifier 26 is supplied with a voltage that varies linearly (e.g., increases in this case) with time. Thus, the current amplifier 26 supplies output current 28 that varies linearly (increases in this case) with time to the first actuator 12. As a result, the SIL 11 comes closer to the optical disc 10. That is to say, the value of the gap 17 is approaching a desired value, and the value of the gap signal 19 that is the output signal of the gap detecting section 18 is getting closer to the reference voltage 21 that has been set by the reference voltage setter 22.

FIG. 2(b) shows the relative positions of the SIL 11, the optical disc 10 and other members at this point in time. As shown in FIG. 2(b), the SIL 11 is coming closer to the optical disc 10, the gap 17 is also getting closer to the desired value, but the distance 30 between the first actuator 12 and the optical disc 10 still has not been varied yet. That is to say, since the SIL 11 has come closer to the optical disc 10, the SIL 11 is getting offset with respect to the first actuator 12 little by little.

As the SIL 11 comes even closer to the optical disc 10, the value of the gap 17 soon becomes approximately equal to the desired value (of about 20 nm, for example), when the value of the gap signal 19 that is the output signal of the gap detecting section 18 becomes almost equal to the reference voltage 21 that has been set by the reference voltage setter 22. At that timing when the value of the gap signal 19 becomes approximately equal to the reference voltage 21, the loop switch 25 is closed in accordance with the loop open/close instruction 24. If the differential amplifier 20 is designed such that its output goes substantially equal to zero when the value of the gap signal 19 becomes approximately equal to the reference voltage 21, the timing to close the loop switch 25 may be determined by monitoring the output of the differential amplifier 20.

The open/close instruction 34 is defined such that no sooner has the loop switch 25 been closed in accordance with the loop open/close instruction 24 than the switch 32 is opened. That is why when the gap 17 becomes approximately equal to the desired value (of about 20 nm, for example), the supply of the output signal of the voltage generator 31 to the current amplifier 26 is shut off. For that reason, when the loop switch 25 is closed, the gap control has already been established.

FIG. 2(c) shows the relative positions of the SIL 11 and the optical disc 10 while the gap control is ON. As shown in FIG. 2(c), the gap 17 has a minimal value and the SIL 11 is located rather close to the optical disc 10. Suppose the surface of the optical disc 10 has shifted upward while the optical disc 10 is rotating, for example. In that case, if the SIL 11 were fixed at a certain position, then the gap 17 would increase. On the other hand, if the gap control is ON, the SIL 11 will also be shifted upward by the first actuator 12, thereby maintaining the magnitude of the gap 17 at a desired value. Even in such a situation, the distance 30 between the first actuator 12 and the optical disc 10 has not been varied, either. That is to say, the gap control has been established with the SIL 11 offset with respect to the first actuator 12 by the distance that the SIL 11 has traveled toward the optical disc 10. In this state, the SIL 11 has been offset with respect to the first actuator 12 in the mechanically equilibrium position, and current to maintain that offset is flowing through the first actuator 12.

Next, by operating the second actuator 29, the optical pickup 13 is brought in its entirety toward the optical disc 10. As shown in FIG. 2(d), the first actuator 12, or the whole optical pickup, is getting closer to the optical disc 10. However, as this operation is carried out with the gap control established, the gap 17 can still maintain its desired value. Nevertheless, as the magnitude of offset of the SIL 11 with respect to the first actuator 12 has decreased, the amount of current flowing through the first actuator 12 to maintain the offset decreases, too.

This operation of bringing the whole optical pickup 13 closer to the optical disc 10 by operating the second actuator 29 is preferably stopped when the average of the current flowing through the first actuator 12 goes substantially zero. The current flowing through the first actuator 12 is the output current 28 of the current amplifier 26, and therefore, can be detected by the current detector 27 shown in FIG. 1.

FIG. 2(e) illustrates a situation where the average of the current flowing through the first actuator 12 has gone approximately zero. In such a state, the offset of the SIL 11 with respect to the first actuator 12 is zero and the SIL 11 is now in its mechanically equilibrium position with respect to the first actuator 12.

The optical information apparatus of this preferred embodiment can achieve the gap control with the SIL 11 fixed in its mechanically equilibrium position (i.e., most stabilized mechanically) with respect to the first actuator 12. Added to that, since the gap control can be established with the amount of direct current flowing through the first actuator 12 reduced to substantially zero, the power dissipation can be cut down, too.

In FIGS. 1 and 2, illustrated is an arrangement for rotating the optical disc 10 on a horizontal plane. However, the optical information apparatus of the present invention is in no way limited to that specific preferred embodiment. Alternatively, an arrangement for rotating the optical disc 10 on a perpendicular plane may also be adopted. In that case, by getting the SIL 11 moved horizontally by the actuators 12 and 29, the gap between the optical disc 10 and the SIL 11 can be adjusted.

Hereinafter, it will be described with reference to FIGS. 5(a) and 5(b) how the current (i.e., drive current) flowing through the first actuator 12 varies its amount until some period of time passes since the gap control has been started with the SIL brought closer to the optical disc.

Figure 5:
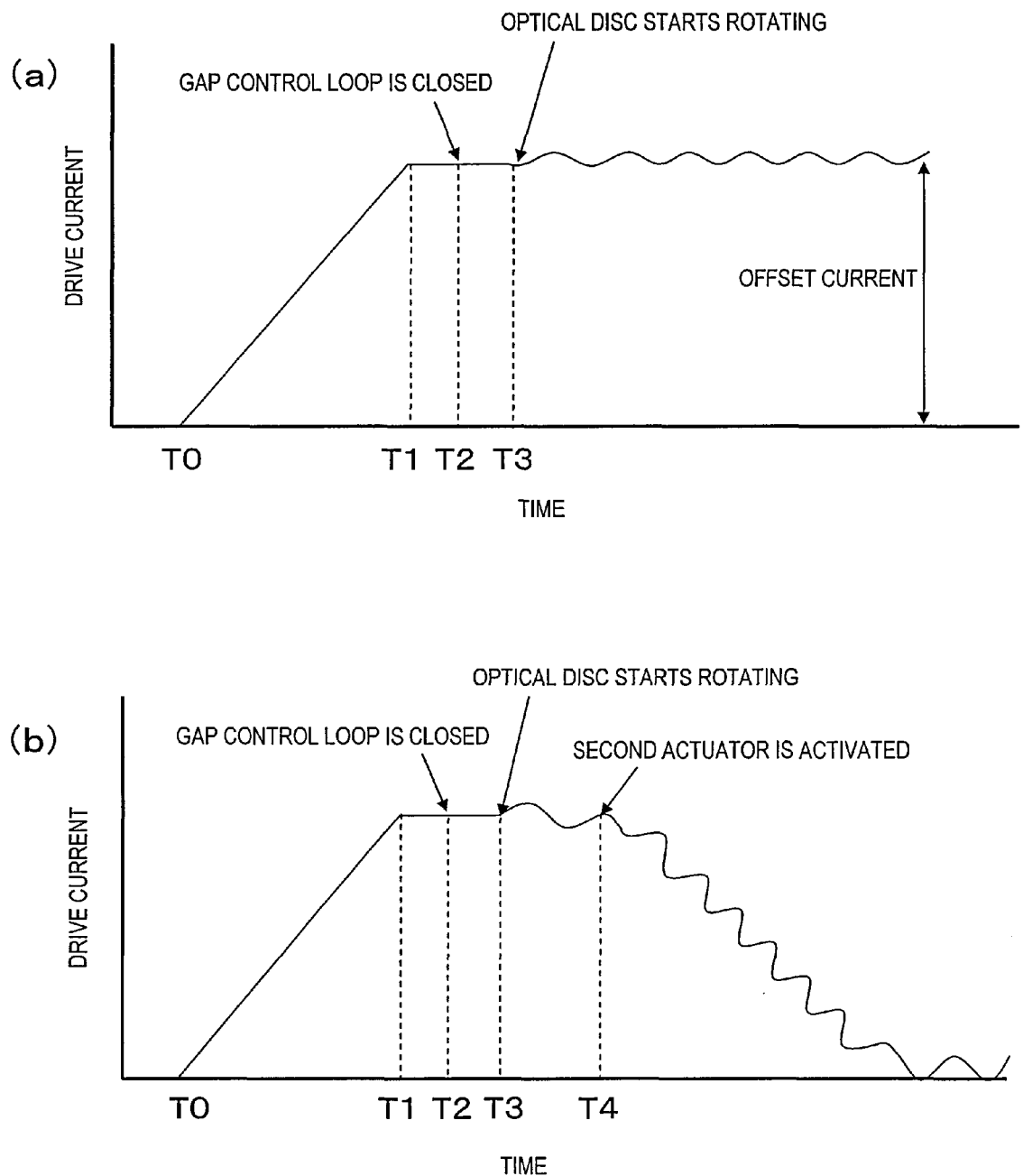
FIGS. 5(a) and 5(b) are graphs showing how the drive current varies its amount in a conventional apparatus and in a preferred embodiment of the present invention, respectively.

FIG. 5(a) is a graph showing a variation in drive current in a conventional apparatus, while FIG. 5(b) is a graph showing a variation in drive current in this preferred embodiment.

In this example of the conventional apparatus, the drive current is gradually increased in the period from the time T0 through the time T1 as shown in FIG. 5(a). In the meantime, the SIL is getting closer to the optical disc as shown in FIG. 2(b). When the gap control loop is closed at the time T2, the control for keeping the gap 17 constant is started as shown in FIG. 2(c). Next, once the optical disc has started rotating at the time T3, the optical disc produces out-of-plane vibrations involved with the rotation. That is why to keep the gap 17 constant by moving the SIL up and down, the drive current will slightly increase and decrease repeatedly. In the prior art, since this state (see FIG. 2(c)) persists even from the time T3 on, the offset current shown in FIG. 5(b) will continue to flow through the first actuator 12. On top of that, as the first actuator 12 performs the gap control operation out of its mechanically equilibrium position, it is difficult for the actuator 12 to maintain good stability.

On the other hand, in this preferred embodiment, the gap control loop is closed at the time T2 shown in FIG. 5(b), the optical disc 10 starts rotating at the time T3, and then the second actuator 29 is activated at the time T4. In this manner, the magnitude of displacement of the SIL 11 caused by the first actuator 12 is reduced as shown in FIGS. 2(d) and 2(e). As a result, as shown in FIG. 5(b), the amount of the drive current flowing through the first actuator 12 decreases and the offset current can be reduced to approximately zero. In the example shown in FIG. 5(b), the second actuator 29 is supposed to be activated after the optical disc 10 has started rotating. However, it is preferred that the second actuator 29 be activated before the optical disc 10 starts rotating.

In the preferred embodiment described above, the amount of current flowing through the first actuator 12 is detected by the current detector 27 and the second actuator 29 is controlled based on its detected value. However, the second actuator 29 may also be controlled based on any other detected value. For example, the level of the control signal 40 may be detected and the second actuator 29 may be controlled based on its detected value. This is because the product of the level of the control signal 40 and the voltage-current transform constant of the current amplifier 26 corresponds to the amount of current flowing through the first actuator 12.

Also, in the preferred embodiment described above, the second actuator 29 varies the distance 30 between the optical disc 10 and the first actuator 12 by moving the optical pickup 13 in its entirety. However, the present invention is in no way limited to that specific preferred embodiment. Alternatively, the apparatus may also be designed such that the second actuator 29 can move only the SIL 11 and the first actuator 12 separately from the optical pickup 13.

Optionally, a second control system for controlling the second actuator 29 based on the detected value of the current detector 27 may also be adopted. The second control system compares the detected value of the current detector 27 to a predetermined reference voltage, performs appropriate phase compensation and drives the second actuator 29. The distance 30 between the first actuator 12 and the optical disc 10 could sometimes be different from one location to another over the entire read/write area on the optical disc 10 due to the degree of mechanical design precision of the optical information apparatus. Even so, the second control system can always keep the amount of direct current flowing through the first actuator 12 a minimum one. As a result, the SIL 11 can always operate in its mechanically equilibrium position (i.e., in mechanically stabilized state) with respect to the first actuator 12.

Embodiment 2

Hereinafter, a second preferred embodiment of an optical information apparatus according to the present invention will be described.

The optical information apparatus of this preferred embodiment has basically the same configuration as the one shown in FIG. 1. Thus, the common structural and operational features of the optical information apparatus between this and first preferred embodiments will not be described all over again. But the following description will be focused on only the distinct features of this preferred embodiment.

The optical information apparatus of this preferred embodiment also controls the actuator so as to maintain the gap between the SIL and the optical disc at a predetermined setting in accordance with a gap signal supplied from the gap detecting section. According to this preferred embodiment, however, special attention is paid to the fact that the gap detection characteristic, representing the relation between the gap and the gap signal, changes according to the type of the given optical disc or the individual properties of the disc itself, and the gap detection characteristic is obtained by recognizing the type or the individual properties of the optical disc that has been loaded into the apparatus. And based on the gap detection characteristic thus obtained, a control target value for the gap signal, corresponding to the predetermined gap setting, is calculated.

Figure 3:
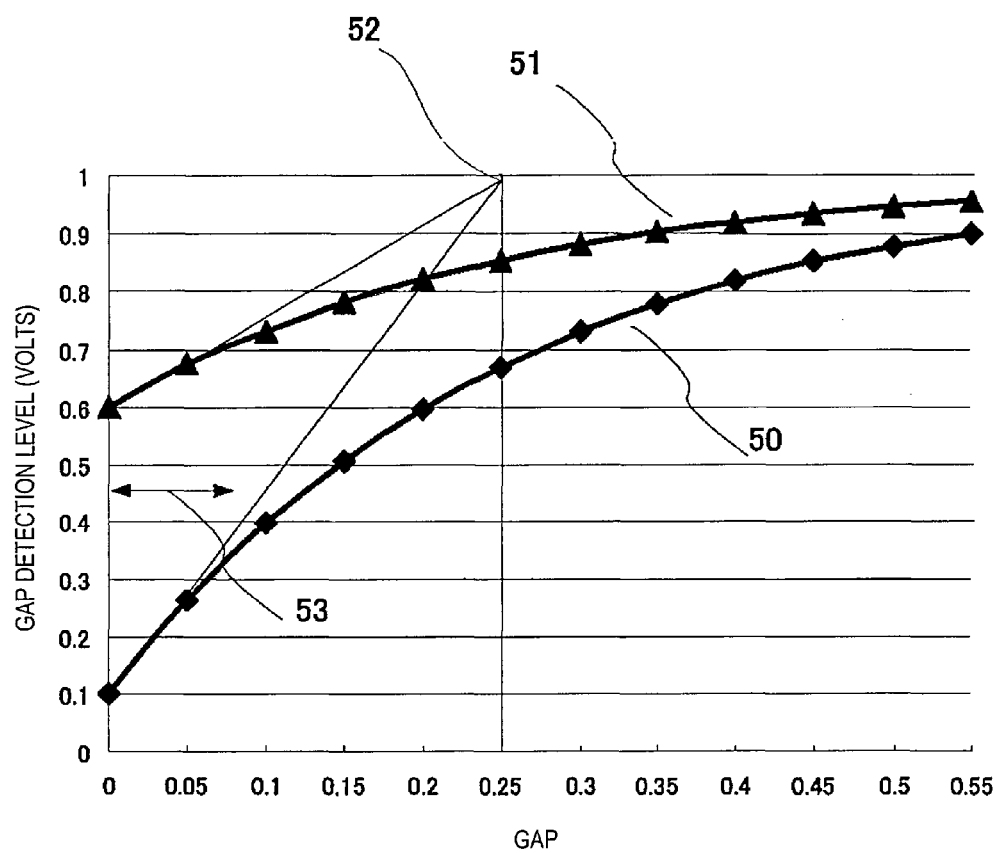
FIG. 3 is a graph showing the gap detection characteristics of two types of optical discs with mutually different reflectances.

FIG. 3 is a graph showing two types of gap detection characteristics. The abscissa represents the gap normalized with the wavelength of the light source (i.e., the wavelength of the irradiating light 14 and reflected light 15 shown in FIG. 1) and indicates the magnitude of the gap 17 between the optical disc 10 and the SIL 11. Since the light source wavelength is 400 nm in this preferred embodiment, a gap of 0.25 shown in FIG. 3 means that a gap with a magnitude of 0.1 μm (=100 nm=400 nm×0.25) is left between the optical disc 10 and the SIL 11. That is why the gap control is carried out so that such a normalized gap can maintain a magnitude of approximately 0.05. In the graph shown in FIG. 3, the ordinate represents the output level of the gap detecting section 18 (i.e., gap detection level that is the level of the gap signal 19) in volts.

Specifically, FIG. 3 shows the gap detection characteristics exhibited by two types of optical discs with mutually different reflectances in a situation where the SIL has an effective refractive index of 2.1. More specifically, the curve 50 connecting the solid diamond data points ♦ represents a gap detection characteristic exhibited by an optical disc with a relatively low reflectance, while the curve 51 connecting the solid triangular data points ▲ represents a gap detection characteristic exhibited by an optical disc with a relatively high reflectance.

In the example shown in FIG. 3, the maximum output level of the gap detecting section 18 (i.e., the maximum gap detection level) is 1 volt. The gap detection level becomes maximum when the SIL is so distant from the optical disc that the light is totally reflected from the edge of the SIL and the intensity of the returning light has not decreased yet. In this case, the gap detecting section 18 is adapted such that the maximum gap detection level becomes equal to 1 volt when the intensity of the returning light is the highest. As the gap widens, the gap detection level rises asymptotically toward the maximum one. As described above, the maximum value of the gap detection level is a numerical value in a situation where the intensity of the light returning from the SIL is not affected by the type or properties of the optical disc 10 and does not depend on the reflectance of the optical disc 10.

The present inventors discovered via experiments that when the normalized gap was in the vicinity of 0.05, there was a linear relation between the gap and the gap detection level and that on each line representing such a linear relation, the (normalized) gap associated with the maximum gap detection level was substantially the same irrespective of the reflectance of the given optical disc as can be seen from FIG. 3. In the example shown in FIG. 3, two approximated lines derived from the curves 50 and 51 intersect with each other at a point 52. At the point 52, the gap signal 19 has a level of 1 volt (i.e., the maximum value). And the magnitude of the gap associated with that point is 0.25 irrespective of the reflectance of the optical disc 10. This value of 0.25 was obtained when the SIL had an effective refractive index of 2.1. And this value may change if the effective refractive index of the SIL varies.

In view of these considerations, according to this preferred embodiment, the gap detection characteristic in a range 53 where the curve representing the gap detection characteristic is substantially linear is approximated with a line that is determined by the type or property of the given optical disc.

Such an approximation line is represented by the following equation:

$$V = B + K(A - B)\frac{G}{X} \qquad (1)$$

where V is a gap detection level (unit: volts), G is the magnitude of the gap 17 (unit: nm), A is the maximum value (unit: volts) of the gap detection level described above, B is a gap detection level (unit: volts) when the magnitude of the gap 17 is equal to zero, K is a correction coefficient, and X is a wavelength (unit: nm). That is to say, G/X is the gap normalized with the wavelength and corresponds to the abscissa of the graph shown in FIG. 3.

In the example shown in FIG. 3, V becomes equal to the maximum gap detection level A when G/X=0.25, and therefore, K=4. It is known that this correction coefficient K is constant irrespective of the reflectance of the optical disc. According to the configuration of the gap detecting section 18, however, K may have a different value. In that case, the best K value may be selected appropriately.

As for two types of optical discs with mutually different reflectances, A and B in the equation mentioned above can be calculated by the following methods:

First, the following Equation (2) is applied to an optical disc with the lower reflectance:

$$V = 0.1 + 4(1 - 0.1)\frac{G}{X} = 0.1 + 3.6\frac{G}{X} \quad (2)$$

On the other hand, the following Equation (3) is applied to the optical disc with the higher reflectance:

$$V = 0.6 + 4(1 - 0.6)\frac{G}{X} = 0.6 + 1.6\frac{G}{X} \quad (3)$$

These Equations (2) and (3) were just obtained from the optical discs with the characteristics shown in FIG. 3. Thus, the A and B values can naturally change according to the type of the given optical disc.

According to this preferred embodiment, every time an optical disc with a different reflectance is loaded, the operation of calculating an approximation line representing the gap detection characteristic is carried out. And the level of the gap signal 19, corresponding to the desired magnitude of gap on the approximation line thus obtained, is calculated. If the reference voltage setter 22 is designed such that the calculated value becomes the reference voltage 21, the gap 17 can always have the desired value irrespective of the reflectance of the optical disc.

Figure 4:
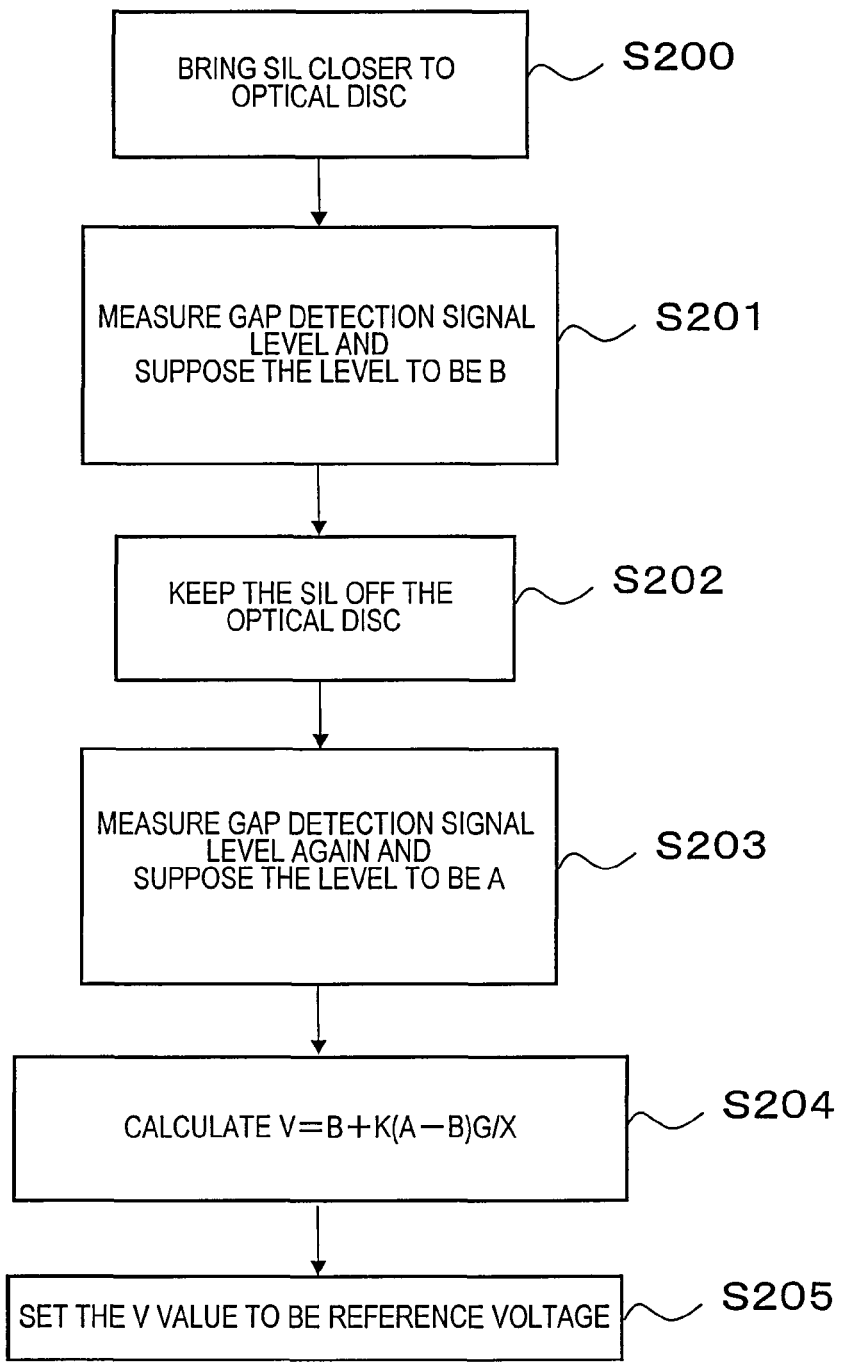
FIG. 4 is a flowchart showing how an optical information apparatus as a second preferred embodiment of the present invention operates.

Hereinafter, the procedure of obtaining such an approximation equation will be described with reference to FIG. 4.

First, in Step S200, the SIL 11 is brought closer to the optical disc 10 by operating the second actuator 29 shown in FIG. 1. Next, in Step S201, the level of the gap signal 19 is measured with a voltmeter, for example, and the measured level is supposed to be the level B.

Subsequently, in Step S202, the SIL 11 is moved away from the optical disc 10 sufficiently. Thereafter, in Step S203, the level of the gap signal 19 is measured again with a voltmeter, for example, and the measured level is supposed to be the level A. In this preferred embodiment, the value A is 1 volt as described above. If the value A is known in advance in this manner, the processing steps S202 and S203 may be omitted. Alternatively, the processing steps S202 and S203 may also be carried out before the processing steps S200 and S201 are performed.

Next, in Step S204, the value V representing the magnitude of the required gap is calculated by Equation (1). Although K=4 in this example, a different K value may be adopted according to the type of the apparatus. Then, in Step S205, the V value thus obtained is defined as a reference voltage 21 for the reference voltage setter 22.

In the preferred embodiment described above, these operations are supposed to be performed manually. However, the present invention is in no way limited to that specific preferred embodiment. Alternatively, the level of the gap signal 19 may be measured with an A/D converter and the second actuator 29 may be driven by a stepping motor, for example. Also, calculation of V by Equation (1) and control of the A/D converter and the stepping motor may be carried out by a CPU.

The value of the reference voltage 21 that has been set in this manner is equal to the level of the gap signal 19 when the gap has the desired magnitude. An appropriate value for the reference voltage 21 can be determined without depending on the reflectance of the given optical disc. That is why even if the input/output characteristic of the gap detecting section 18 changes according to the type of the given optical disc, the magnitude of the gap can always be constant when the gap control is established.

In the preferred embodiment described above, to obtain either the maximum value A of the gap signal 19 or the value B of the gap signal 19 when the magnitude of the gap 17 is zero, the SIL 11 is moved by the second actuator 29. However, the present invention is in no way limited to that specific preferred embodiment. The maximum value A of the gap signal 19 can also be obtained by measuring the level of the gap signal 19 when the apparatus is loaded with no optical disc 10 yet. Also, the value B of the gap signal 19 when the magnitude of the gap 17 is zero can be obtained by holding the optical disc 10 with a hand and bringing the disc 10 into contact with the SIL 11.

The present invention is also applicable to even a situation where there are areas with multiple different reflectances on the same optical disc. Suppose such a difference in reflectance has been made in the radial direction of the optical disc for some reason during the manufacturing process of the optical disc. In that case, the operations of the preferred embodiment described above are carried out on the inner, intermediate and outer areas of the optical disc and gap control reference voltages are defined in advance for those areas with their difference in reflectance taken into account. And when a read/write operation is performed on any of those areas of the optical disc, its associated reference voltage is adopted. Then, even if the reflectance is not constant over the entire area of the same optical disc, the desired gap can also be secured.

Furthermore, even if such a difference in reflectance on the same optical disc has been made not only for some manufacturing process related reasons but also depending on whether or not the given area is a recorded area or an unrecorded area and whether or not a particular recording pattern has been written on that recorded area, the desired gap can also be ensured by performing similar operations.

Optionally, by sensing a difference in the level B of the gap signal 19 that is measured with the SIL 11 brought closer to the optical disc 10, the type of the given optical disc can also be recognized. Those "types" of optical discs may refer to whether the given optical disc is a ROM (read-only) type or a read/write type. Based on the type of the given optical disc that has been recognized in this manner, the operations of various circuits that form the optical disc drive may be switched such that the best processing is performed according to the type of the optical disc recognized. For example, the operating points of an AGC for keeping the amplitude of a read RF signal constant may be switched between a ROM type optical disc and a read/write type optical disc. Then, based on the measured value of the level B of the gap signal 19 described above, the operating points of the AGC are changed. The level B of the gap signal 19 is measured before the optical disc 10 is driven by the optical information apparatus, and the type of the given optical disc 10 is recognized at that point in time. That is why the operating points of the AGC described above may also be switched before the optical disc 10 is driven. As a result, in an initial stage in which the optical disc has just started to be driven by the optical information apparatus, the best operation can be performed according to the type of the given optical disc. Consequently, the disc loading process can be started in a shorter time.

INDUSTRIAL APPLICABILITY

The optical information apparatus of the present invention can perform a stabilized and reasonable gap control for keeping the gap between an SIL and the given optical disc constant, and therefore, can be used effectively as an optical information apparatus for reading and writing a signal from/on an optical information storage medium using near-field light.

The invention claimed is:

1. An optical information apparatus comprising:
an optical system that includes a solid immersion lens and that produces near-field light to be incident on an optical information storage medium;
a first actuator for displacing the solid immersion lens;
a second actuator for varying the distance between the optical information storage medium and the first actuator by moving the first actuator;
a gap detecting section for outputting a gap signal representing the magnitude of the gap between the solid immersion lens and the optical information storage medium; and
a gap control system for controlling the first actuator in response to the gap signal such that the gap is maintained at a predetermined setting,
wherein the gap control system works so as to control the second actuator in accordance with a signal representing the magnitude of displacement of the solid immersion lens caused by the first actuator.

2. The optical information apparatus of claim 1, wherein the signal representing the magnitude of displacement of the solid immersion lens caused by the first actuator is a DC component of a drive signal to be supplied to the first actuator, and
wherein the second actuator is controlled so as to minimize the DC component of the drive signal.

3. The optical information apparatus of claim 2, wherein the drive signal is current supplied to the first actuator, and
wherein the magnitude of displacement of the solid immersion lens caused by the first actuator is proportional to the amount of the current supplied to the first actuator.

4. The optical information apparatus of claim 1, comprising an optical pickup that is movable parallel to the surface of the optical information storage medium,
wherein the solid immersion lens and the first actuator are arranged inside the optical pickup, and
wherein the second actuator moves the optical pickup perpendicularly to the surface of the optical information storage medium.

5. A method for driving the optical information apparatus of claim 1, the method comprising the steps of:
getting the solid immersion lens displaced by the first actuator, thereby bringing the solid immersion lens closer to the optical disc;
activating the gap control system to control the first actuator such that the gap is maintained at the predetermined setting in response to the gap signal supplied from the gap detecting section; and
making the gap control system work so as to control the second actuator in accordance with the signal representing the magnitude of displacement of the solid immersion lens by the first actuator and bring the first actuator closer to the optical disc with the gap maintained at the predetermined setting.

6. An optical information apparatus comprising:
an optical system that includes a solid immersion lens and that produces near-field light to be incident on an optical disc;
an actuator for displacing the solid immersion lens;
a gap detecting section for outputting a gap signal representing the magnitude of the gap between the solid immersion lens and the optical disc; and
a gap control system for controlling the actuator in response to the gap signal such that the gap is maintained at a predetermined setting,
wherein the apparatus calculates a control target value for the gap signal, corresponding to the predetermined gap setting, in accordance with a gap detection characteristic defining a relation between the gap and the gap signal,
the gap control system controls the actuator such that the gap signal comes to have the control target value,
the gap detection characteristic is determined based on first and second values of the gap signal to be output from the gap detecting section when first and second gaps respectively are left between the solid immersion lens and the optical disc, and
the control target value V for the gap signal, corresponding to the predetermined gap setting G, is calculated by $$V = B + K(A-B)\frac{G}{X}$$

where A is the first value when the first gap is defined to be sufficiently greater than the spot size of the near-field light, B is the second value when the second gap is defined to be smaller than the size of the near-field light, G is the magnitude of the gap between the solid immersion lens and the optical disc, K is a correction coefficient, and X is the wavelength of the near-field light.

7. A method for driving the optical information apparatus of claim 6, the method comprising the steps of:
getting, as a first value, the level of the gap signal supplied from the gap detecting section with the solid immersion lens kept off the optical disc so that the near-field light is unable to reach the optical disc;
getting, as a second value, the level of the gap signal supplied from the gap detecting section with the solid immersion lens brought closer to the optical disc;
determining a gap detection characteristic defining a relation between the gap and the gap signal by the first and second values; and
calculating the control target value for the gap signal, corresponding to the predetermined gap setting, based on the gap detection characteristic,
wherein the actuator is controlled such that the gap signal comes to have the control target value.

* * * * *